June 23, 1970  R. C. SMITH ET AL  3,516,133
HIGH TEMPERATURE BULK CAPACITOR
Filed Oct. 18, 1967
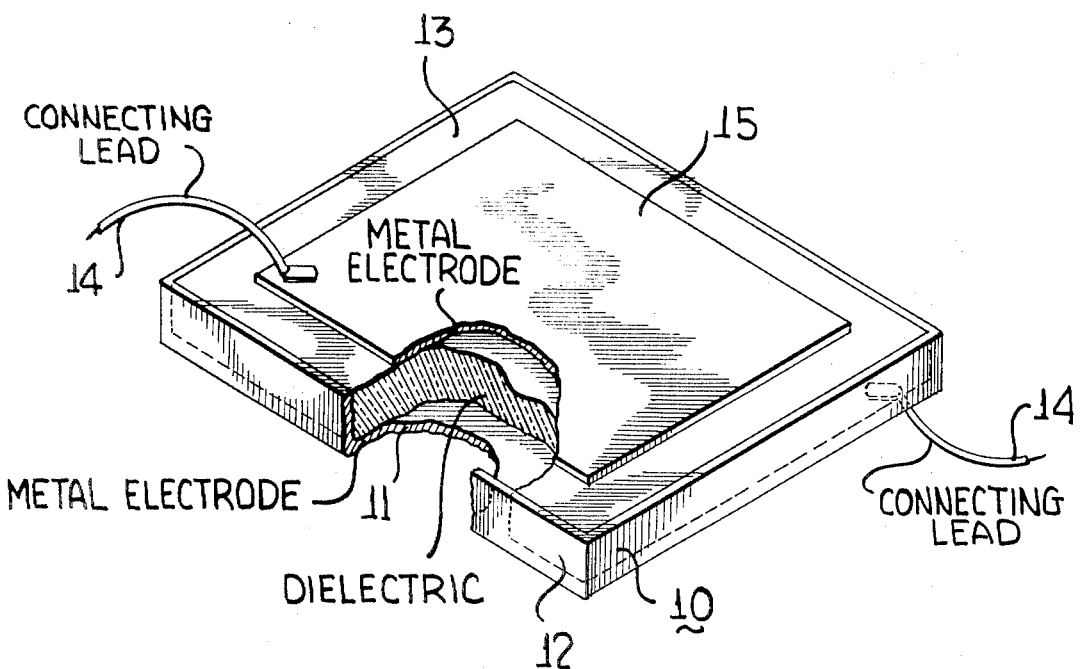
INVENTORS
RICHARD C. SMITH,
CHARLES W. MOULTON
& CHARLES FELDMAN
BY Hurwitz, Rose & Greene
ATTORNEYS United States Patent Office 3,516,133
Patented June 23, 1970

3,516,133
HIGH TEMPERATURE BULK CAPACITOR
Richard C. Smith, Dayton, and Charles W. Moulton, Columbus, Ohio, and Charles Feldman, Alexandria, Va., assignors to Melpar, Inc., Falls Church, Va., a corporation of Delaware
Filed Oct. 18, 1967, Ser. No. 676,261
Int. Cl. C03b *19/00;* C03c *29/00;* H01g *13/00*
U.S. Cl. 29—25.42                                    10 Claims

ABSTRACT OF THE DISCLOSURE

Process of forming a bulk capacitor having stable electrical properties over a wide temperature range, in which the dielectric material is a rare earth sesquioxide-boric oxide glass. The glass is formed in any desired geometrical shape by molding, drawing or extruding techniques, and appropriate conductive electrodes attached.

BACKGROUND OF THE INVENTION

The present invention relates generally to electrical capacitors, and more particularly to bulk electrical capacitors or condensers in which a rare earth sesquioxide-boric oxide glass is utilized as the dielectric to provide electrically stable properties over a wide temperature range.

In situations where electronic circuitry must operate in extreme temperature environments, for example, under conditions of missile or space vehicle re-entry into the earth's atmosphere, it is essential that each circuit component have temperature-stable electrical characteristics in order that proper operation be maintained over the entire temperature range to which the system is subjected, with performance equal or substantially equal to that at nominal temperatures. Many prior art circuit elements, such as capacitors, have been found to exhibit instability of electrical characteristics where high ambient operating temperatures, such as temperatures in excess of 150° C. are encountered. While such conventional expedients as the use of thermal insulation about the electronic circuitry and/or utilization of special cooling techniques for the circuitry, in an attempt to maintain environmental temperature as uniform as possible, have had some measure of success, they lead to a substantial increase in size of equipment required to complete the mission. In addition, such prior art techniques result in an undesirable increase in complexity of equipment required to maintain high operational performance over wide temperature ranges. A multitude of experiments involving attempts to produce electrically stable high temperature capacitors in the prior art has shown that extremely high temperatures, i.e., a few orders of magnitude greater than those at which the capacitor is to operate, are required for fabrication. As a consequence, production costs are high.

Accordingly, the primary objects of the present invention are to provide electrical capacitors or condensers that exhibit thermally stable electrical characteristics over a considerable range of temperatures, and to provide methods for fabricating such capacitors.

A more specific object of the present invention is to provide bulk capacitors having thermally stable electrical properties over a temperature range extending from zero degrees centigrade to 500 degrees C.

SUMMARY OF THE INVENTION

According to the invention, a bulk form capacitor which is electrically stable over a wide temperature range is fabricated using a glass dielectric composed of an oxide of a rare earth metal, or of a metal related to the rare earths, and boric oxide. The two oxides are combined in a homogeneous mixture which is melted, solidified, and any traces of uncombined oxide dissolved, to provide a substantially pure, chemically stable glass dielectric.

While a mixture of rare earth sesquioxide with boric oxide and boron nitride has been employed in the formation of thin film capacitors (see copending application for U.S. Letters Patent Ser. No. 391,543, of Richard C. Smith et al., entitled "Thin Film Capacitor," filed Aug. 24, 1964, and commonly assigned herewith), insofar as we are aware such materials have not previously been adapted to use in bulk form capacitors. It is toward processes for fabrication of bulk form capacitors having as a dielectric a mixture of an oxide of a rare earth metal and boric oxide, that the present invention is directed.

BRIEF DESCRIPTION OF THE DRAWINGS

The above and still further objects, features and attendant advantages of the present invention will become apparent from a consideration of the following detailed description of a preferred embodiment thereof, and a preferred process for producing that embodiment, especially when taken in conjunction with the accompanying drawing, in which the sole figure is a perspective fragmentary view of a capacitor formed in accordance with the present invention.

DESCRIPTION OF A PREFERRED PROCESS AND EMBODIMENT

The dielectric material which is to be utilized in the fabrication of the high temperature bulk capacitor is prepared in the following manner:

Example

Boric oxide ($B_2O_3$), which may be in powder or granular form and which is of high purity, over 99%, is heated and melted in a platinum crucible at 1000° C. for approximately thirty minutes. After removal of the crucible from the oven following this melting period, the melt is poured onto a clean aluminum plate for rapid cooling. Upon solidification of the melt, the resulting solid is stored in an evacuated desiccator.

The dry solid so obtained, and preferably prepared in quantity in advance of the actual capacitor fabrication, is used in a mixture in the ratio of three parts by weight to seven parts by weight of powdered high purity neodymium oxide ($Nd_2O_3$). The $B_2O_3$—$Nd_2O_3$ mixture is then finely ground to obtain a homogeneous mixture of the two oxides. The oxidic mixture is placed in a clean platinum crucible and heated to a temperature of approximately 1,190° C. Heating at this temperature for approximately ten minutes produces a melt, which may be poured onto an aluminum plate for rapid cooling.

The glass dielectric so formed consists generally of two parts, viz., a clear violet glass surrounded by areas of white pure $B_2O_3$ glass. After cooling, the glass dielectric is placed in distilled water and the $B_2O_3$, which is hygroscopic, is dissolved in the water. Hence, the remaining mixture when removed from the water, is a pure $$Nd_2O_3\text{—}B_2O_3$$

glass, which has been found to be chemically stable, and which can be formed into any desired geometrical shape by use of standard glass blowing, molding, drawing, or extruding techniques.

A high temperature capacitor may be formed utilizing the pure $Nd_2$—$B_2O_3$ glass dielectric material as follows:

Example

With reference to the figure, pieces of the above formed $Nd_2O_3$—$B_2O_3$ glass are placed in a platinum dish 10 having a base 11 approximately 1″ square and sides 12 about .050″ deep, in an amount sufficient to fill the dish when the glass is melted. The dish and its glass dielectric contents are then placed in an oven preheated to a temperature of approximately 1200° C., in an environment of air. A suitable oven for this purpose is the well known type marketed under the name "Glo-Bar Furnace."

When the glass dielectric 13 has melted and flowed evenly across the dish (accomplished in a period of approximately ten minutes at the specified temperature), the sample is removed from the oven and cooled relatively slowly. When the sample has cooled (for example to room temperature) a platinum plate 15 is applied to the surface of the dielectric opposite or remote from the base of dish 10. Plate 15 may, for example, be a platinum paint, marketed under the trade name "Liquid Bright Platinum" available from the Hanovia Chemical and Manufacturing Company of East Newark, N.J. (number 05 type), and is applied to the top glass surface.

The sample is then placed in a Pyrex dish, and the dish and its contents placed in a furnace, preheated to approximately 400° C., for about 30 minutes. At the end of this 30 minute period the furnace temperature is raised to about 725° C. for an interval of 20 minutes. The furnace heating element may be deenergized after the last-mentioned 20 minute period, or the sample removed from the furnace, and the sample permitted to cool slowly. Electrical connections or leads may be provided on or established to the lower electrode 11, 12 of platinum dish 10 and to the top electrode 15 by spot welding leads 14, preferably gold of about 5 mil diameter, thereto.

Measurements were performed on a bulk capacitor fabricated in the above-described manner to determine the electrical characteristics and parameters of the capacitor, in the following manner:

The capacitor was placed in a ceramic sample holder and aluminum shielded box. This equipment was then inserted in a Delta Design, Model CR temperature controlled oven, having a temperature accuracy of plus or minus 1 degree C. Measurements of capacitance and dissipation factor were made using a General Radio Company Model 1620 capacitance bridge at frequencies of 20 kc., 50 kc., and 100 kc. obtained by appropriate adjustment of the output of a Hewlett Packard 200 CDR wide range oscillator fed into the capacitance bridge. External lead lengths were maintained as short as possible in order to determine the precise capacitance of the capacitor. Stray capacitance in the temperature measurements, for example that introduced by lead length, shielding, ceramic holder, and other factors, was determined and appropriately compensated in the final measurement by subtraction from the total capacitance. No correction was made for edge or ground effects, however.

The pure capacitance measured at room temperature and at a frequency of 1 kilocycle per second was found to be 64.7 picofarads (pf.). Data taken over wide ranges of temperature and frequency indicated substantially no deviation from this capacitance value. The total stray capacitance was found to be 5.306 pf. and in each case was subtracted from the measured value. The measurements indicated a dielectric constant of about 6.96±.70 and a dissipation factor of .0028±.0001 for the capacitor under test.

While the exact reasons for the extremely temperature stable electrical characteristics of such a capacitor are not completely clear, it is believed that the stability is inherent in the structure of the glass dielectric. That is, the closely packed tetrahedral structure of the $B_2O_3$ glass former, coupled with the large positive rare earth (e.g., neodymium) modifier ion bound interstitially in the structure, is effective to permit practically no ion motion, either impurity or modifier, in the glass. In general, the principal cause of high dissipation factor of capacitors is attributed to ion conduction or small localized motion in the dielectric. Gevers, in Phillips Research Reports, 1, page 279 (1946), has shown that the temperature coefficient of capacitance is proportional to the dissipation factor. Hence, it follows that where the dissipation factor can be maintained at a relatively small value, a corresponding decrease in the temperature coefficient of capacitance can be achieved.

Operation of the high temperature capacitor is identical to that of any standard capacitor, except for its temperature stable electrical characteristics, so that no detailed description of operation need be presented here.

It is to be emphasized that the high temperature capacitor and the process for fabrication thereof described above, while being preferred, are to be taken as exemplary. Many rare earth sesquioxide-boric oxide glasses can be similary fabricated and utilized as dielectrics for such high temperature capacitors, in amounts by weight corresponding to those of the $Nd_2O_3$—$B_2O_3$ embodiment. Further examples of suitable rare earth sesquioxides which may be used in mixture with the boric oxide to obtain the desired temperature stable glass dielectric includes $Ce_2O_3$, $Pr_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, and $Yb_2O_3$. In addition, oxides of those elements related to the rare earths may also be employed, for example, $Sc_2O_3$, $Y_2O_3$, $La_2O_3$, and $HfO_2$. Moreover, any of the metals commonly utilized for capacitor electrodes and plates, including gold, silver, platinum, aluminum, and copper, may be used as the electrodes for the high temperature capacitor. The electrodes may be vacuum evaporated, metal foil, painted, or deposited or applied to the dielectric by any other standard technique. Further, the electrical connections to the capacitor plates may be made by spot welding of leads as in the above-described process, or by any other conventional technique.

The rare earth sesquioxide-boric oxide glasses are also compatible with silk screening fabrication techniques. To this end, the glass may be ground and mixed with an organic base, silk screened, and fired, as is conventionally done with other glasses.

What is claimed is:

1. A process for fabricating high temperature bulk capacitors comprising the steps of preparing a glass dielectric in the form of a mixture of a substantially pure rare earth metal oxide and boric oxide, depositing the dielectric in a molten state relatively evenly over a surface of a metal electrode, cooling the dielectric, and applying a further metal electrode to the surface of the dielectric opposite the first-mentioned metal electrode wherein said rare earth metal oxide is the sesquioxide of a rare earth metal from the group consisting of Ce, Pr, Nd, Sm, Eu, Gd, Tb, Dy, Ho, Er, Tm, Yb, and La.

2. A process for fabricating high temperature bulk capacitors comprising the steps of preparing a glass dielectric in the form of a mixture of a substantially pure rare earth metal oxide and boric oxide depositing the dielectric in a molten state relatively evenly over a surface of a metal electrode, cooling the dielectric, and applying a further metal electrode to the surface of the dielectric opposite the first-mentioned metal electrode wherein said dielectric is $Nd_2O_3$—$B_2O_3$.

3. The process of claim 2 wherein each of said electrodes is platinum.

4. The process of claim 2 wherein said dielectric is composed of three parts by weight of $B_2O_3$ to seven parts by weight of $Nd_2O_3$.

5. A process for fabricating high temperature bulk capacitors comprising the steps of preparing a glass dielectric in the form of a mixture of a substantially pure rare earth metal oxide and boric oxide, depositing the dielectric in a molten state relatively evenly over a surface of a metal electrode, cooling the dielectric, and applying a further metal electrode to the surface of the dielectric opposite the first-mentioned metal electrode, wherein said mixture is formed by homogeneously combining said oxides in powdered form, and wherein traces of uncombined oxide are removed from said dielectric after reduction thereof to said molten state.

6. A process for producing electrical capacitors of bulk form and capable of stable operation in a range up to and exceeding 150° C., said process comprising the steps of combining powdered rare earth sesquioxide with a smaller amount of powdered boric oxide, each of high purity, to obtain a substantially pure homogeneous mixture of the two with a balance of only impurities to the extent present, melting the mixture, removing traces of uncombined oxide should they exist after melting of the mixture, and interposing the dielectric material mixture thereby obtained between suitable electrodes to form a bulk capacitor.

7. The process of claim 6 wherein said rare earth sesquioxide is $Nd_2O_3$.

8. The process of claim 6 wherein said melted dielectric mixture is solidified prior to application of said electrodes thereto.

9. The process of claim 6 wherein said melted mixture is solidified prior to removal of traces of uncombined oxide.

10. The process of claim 9 wherein said uncombined oxide is removed by dissolution in distilled water.

References Cited

UNITED STATES PATENTS

| | | | |
|---|---|---|---|
| 2,211,583 | 8/1940 | Ruben | 29—25.41 X |
| 2,731,706 | 1/1956 | Grouse | 29—25.42 |
| 2,972,180 | 2/1961 | Gulton | 29—25.42 |
| 3,072,831 | 1/1963 | Kurland | 29—25.42 X |
| 3,280,448 | 10/1966 | Brajer | 29—25.42 |
| 3,292,053 | 12/1966 | Giacomo | 29—25.41 X |
| 3,330,696 | 7/1967 | Ullery | 29—25.42 X |
| 3,314,124 | 4/1967 | Okamoto | 29—25.41 X |
| 3,386,856 | 6/1968 | Noorlander | 29—25.42 X |
| 3,390,012 | 6/1968 | Haberecht | 29—25.42 X |
| 3,394,290 | 7/1968 | Boykin | 29—25.42 X |
| 3,106,463 | 10/1963 | Norton | 65—45 |
| 3,130,031 | 4/1964 | McMahon | 65—155 |
| 3,325,586 | 6/1967 | Suddick | 65—154 X |
| 3,365,284 | 1/1968 | Alessi | 65—154 X |
| 3,442,993 | 5/1969 | Yamamoto | 65—155 X |
| 3,417,459 | 12/1968 | Pomerantz | 29—472.9 |

FOREIGN PATENTS 1,006,722   10/1965   Great Britain.

WAYNE A. MORSE, Primary Examiner

U.S. Cl. X.R.

29—472.9; 65—45, 155